Patented Feb. 7, 1928.

1,658,597

UNITED STATES PATENT OFFICE.

PALMER W. GRIFFITH, OF ELIZABETH, NEW JERSEY, ASSIGNOR TO AMERICAN CYANAMID COMPANY, OF NEW YORK, N. Y., A CORPORATION OF MAINE.

CONDENSATION PRODUCT AND METHOD OF MAKING SAME.

No Drawing.   Application filed August 16, 1924.  Serial No. 732,569.

This invention relates to resinous materials, more particularly to synthetic resins of formaldehyde and nitrogen compounds.

It is well recognized that urea and formaldehyde may be caused to react to produce resinous bodies which are colorless and transparent, and which may be utilized commercially in the form of solutions, as liquids, or as molding mixtures by casting or by treatment with heat or with heat and pressure to produce materials which are infusible, insoluble and non-inflammable. In accordance with a proposed process, the condensation reaction was carried out in two stages. In the first stage a mixture of urea and formaldehyde was rendered slightly alkaline by the addition of a suitable alkali and then heated to boiling for a sufficient length of time to effect initial condensation of the two materials. The solution was then made slightly acid and polymerization caused to take place in the boiling solution, resulting in a resinous material. If the addition of alkali and acid in the two stages was not regulated to a very close degree, the reaction mixture became non-resinous, hard, brittle and opaque.

In accordance with another proposed process, the condensation took place under somewhat different conditions. In general, during the initial stages of the reaction the hydrogen ion concentration was such that the solution was slightly alkaline or slightly acid, provided it was not more acid than the neutral point of methyl red, and during the latter part of the reaction the hydrogen ion concentration was maintained at the neutral point of methyl red. If the hydrogen ion concentration was too high during either the first or second stage of the reaction, an opaque product resulted. If the hydrogen ion concentration was too low, and especially during the second stage, the solution did not set to a hard, insoluble resin. The allowable range of hydrogen ion concentration in the second stage of the process was very narrow, say between a pH$^+$ of 4.5 to a pH$^+$ of 6, that is, a range varying but slightly from the neutral point of methyl red. It is difficult to maintain solutions within such a narrow range in practice and the result has been that colorless, transparent urea-formaldehyde resins have never been successfully produced on a commercial scale.

It is among the objects of the present invention to overcome the difficulties encountered in the processes of the prior art and to provide a method of producing resins which shall be less sensitive than the prior methods and whereby there may be produced a satisfactory commercial resin without minute control of the steps of the process and without the necessity of expert operators to conduct the process.

I have discovered that the addition of guanidine or a salt of guanidine with a weak acid, such as carbonic acid, which is liberated and driven off in the course of the reaction, to a formaldehyde-urea mixture permits the production of colorless, transparent resins from solutions the reaction of which varies much more widely than in the prior processes. The quantity of guanidine or guanidine carbonate that is added to produce this beneficial result may be as little in amount as one-half of one per cent of the quantity of urea. I have found, however, that the larger the proportion of guanidine or guanidine carbonate used, the wider is the hydrogen ion range over which I can operate. Thus when I treated a mixture of urea and guanidine carbonate in which urea represented 70% of the total and the guanidine carbonate 30% of the total, I found that a hard, colorless, transparent resin could be produced between pH$^+$ limits of 4.0 and 6.0.

I have further discovered that a satisfactory resin may be produced by the use of guanidine alone without any urea. I may utilize a salt of guanidine, such as the carbonate, mix the same with a suitable quantity of formaldehyde, and then heat to cause a reaction to take place to form a satisfactory resin even if the acidity is as high as pH$^+$3 or as low as pH$^+$10.

The following is a specific example of the operation of my process:

I provide a solution containing about 40% formaldehyde and dissolve therein urea and guanidine carbonate, the latter being equal in amount to about 10% of the weight of the urea. The formaldehyde is in the proportion of two mols to each mol of urea and guanidine carbonate used. The solution is filtered to remove any insoluble matter that may be present, and then brought to a boil in an apparatus with a refluxing condenser. After refluxing the solution for thirty minutes I remove the condenser and evaporate the solution until about two-thirds of the water has been removed. During the evaporation reaction of the solution is adjusted to the neutral point of methyl red using for this purpose an acid, such as hydrochloric acid. I place the concentrated solution in a drying apparatus, the temperature of which is 60° C. at the start and which is gradually raised to 80° to 90° C. After from three to six hours I obtain a hard, colorless, transparent, resinous material as a final product.

In using guanidine alone for the production of a resin, I may take one part of guanidine, mix the same with two and one-half to three parts of a 40% solution of formaldehyde and boil until strong foaming takes place. The resin thus formed is poured into a mold and is dried at 60° C. to give a hard, transparent, colorless resin which is free from bubbles.

By the use of guanidine alone or in admixture with urea to produce a resin, I obtain many advantages over the procedures and resins of the prior art as follows:

1st. According to prior processes there was added an alkaline reagent, such as sodium hydroxide, in order to neutralize the acidity of the formaldehyde. The use of such alkaline reagents not only narrowed the hydrogen ion range over which the prior processes could be operated, but their ultimate reaction products caused the desired resin to turn opaque, as well as affect unfavorably the electrical properties of the resin. Guanidine or guanidine carbonate is alkaline in reaction to such a degree that they are capable of neutralizing the acidity which is characteristic of formaldehyde solutions. I thus avoid the use of alkaline reagents, such as sodium hydroxide, and consequently avoid the ill effects caused by them. In fact I find that guanidine in addition to widening the allowable hydrogen ion range, has a beneficial effect on the transparency of the resin, and being a non-electrolyte, does not unfavorably affect its electrical properties.

2nd. Although in the examples of my process given above I have stated that the solution should be adjusted to the neutral point of methyl red for the condensation step, I have found that it is not necessary to maintain the solution exactly at this point as is necessary in the prior processes. That is, when I made the solution alkaline with guanidine for the refluxing step, I found that the refluxing can be carried out without further control of the reaction of the solution, and for the condensation step. I have found that with a solution slightly acid to methyl red, I may still obtain a hard, colorless, transparent resin. This is a distinct advantage because it means my process can be carried out under much less carefully controlled conditions than are necessary in proceeding according to said prior processes.

3rd. I have also found that the period of resinification is greatly shortened when guanidine or guanidine carbonate is used as hereinbefore set forth. This is a decided advantage because in the said prior processes the hardening or resinification may take 168 hours or longer, whereas when guanidine is used according to my process the hardening may take as little as 6 hours, depending upon the quantity of guanidine used.

The meaning of the symbol pH as used herein is defined by the following equation:

$$pH = \log\left(\frac{1}{H^+}\right)$$

in which (H+) represents the concentration of hydrogen ions expressed in terms of normality, it being understood that a normal solution of hydrogen ions is a solution each liter of which contains 1 gram atom of hydrogen ions. Thus $-pH^+5$ means that each liter of solution contains $10^{-5 \times 1}$ grams of ionized hydrogen.

Although I have described my invention, setting forth several embodiments thereof, it is apparent that variations in the details of manipulation and proportions of ingredients may be made without departing from the spirit of my invention. In place of the formaldehyde, I may substitute other bodies of a similar nature, and in place of guanidine, I may use homologues or derivatives thereof or substances which liberate guanidine. I may provide a solution of cyanamid and ammonia in place of guanidine, or I may utilize a solution of cyanamid and hexamethylenetetramin in place of guanidine and formaldehyde and thereby obtain a good resin. These and other changes in my invention may be made within the scope thereof.

What I claim is:

1. A condensation product comprising the reaction product of guanidine, urea and formaldehyde.

2. A condensation product comprising the reaction product of guanidine carbonate, urea and formaldehyde.

3. A condensation product comprising the reaction product of guanidine, urea and formaldehyde, the amount of guanidine being at least 10% of the urea.

4. A condensation product comprising the reaction product of guanidine, urea and formaldehyde, the amount of guanidine being 10% to 30% of the urea.

5. A method of making resinous condensation products which comprises providing a mixture of guanidine, urea and formaldehyde and heating to cause condensation to take place.

6. A method of making resinous condensation products which comprises providing a mixture of guanidine carbonate, urea and formaldehyde and heating to cause condensation to take place.

In testimony whereof, I have hereunto subscribed my name this 8 day of August 1924.

PALMER W. GRIFFITH.